(12) United States Patent
Nakashima et al.

(10) Patent No.: US 12,308,882 B2
(45) Date of Patent: May 20, 2025

(54) NONLINEARITY COMPENSATION CIRCUIT, AND OPTICAL TRANSCEIVER

(71) Applicant: Fujitsu Limited, Kawasaki (JP)

(72) Inventors: Hisao Nakashima, Kawasaki (JP); Naoya Okada, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 211 days.

(21) Appl. No.: 18/089,250

(22) Filed: Dec. 27, 2022

(65) Prior Publication Data

US 2023/0318709 A1  Oct. 5, 2023

(30) Foreign Application Priority Data

Mar. 30, 2022  (JP) .................. 2022-056189

(51) Int. Cl.
*H04B 10/61*  (2013.01)
*H04B 10/2543*  (2013.01)

(52) U.S. Cl.
CPC ..... *H04B 10/2543* (2013.01); *H04B 10/6163* (2013.01)

(58) Field of Classification Search
CPC .................................. H04B 10/6163
See application file for complete search history.

(56) References Cited

U.S. PATENT DOCUMENTS

| | | | |
|---|---|---|---|
| 2009/0269076 A1* | 10/2009 | Cai | H04B 10/695 375/317 |
| 2014/0080430 A1* | 3/2014 | Lee | H04B 13/005 455/226.1 |
| 2015/0071656 A1 | 3/2015 | Oyama et al. | |
| 2015/0222359 A1 | 8/2015 | Kai et al. | |
| 2017/0149507 A1 | 5/2017 | Le Taillandier De Gabory | |

FOREIGN PATENT DOCUMENTS

| | | |
|---|---|---|
| EP | 3249819 | 11/2017 |
| JP | 2015-056752 | 3/2015 |
| JP | 2015-146535 | 8/2015 |
| JP | 2017-511060 | 4/2017 |
| JP | 2018-509860 | 4/2018 |

OTHER PUBLICATIONS

Zhang et al., "High Symbol Rate Signal Generation and Detection With Linear and Nonlinear Signal Processing", Journal of Lightwave Technology, vol. 36, No. 2, Jan. 2018 (Year: 2018).*

(Continued)

*Primary Examiner* — Shi K Li
(74) *Attorney, Agent, or Firm* — STAAS & HALSEY LLP

(57) ABSTRACT

A nonlinearity compensation circuit includes a detector that detects a combination of input levels of a plurality of input signals, a memory that saves a correction value information item to compensate for nonlinear distortion, the correction value information item being saved corresponding to the combination of the input levels, and a compensator that corrects a target signal among said plurality of input signals using the correction value information item acquired from the memory based on the combination of the input levels detected by the detector.

11 Claims, 12 Drawing Sheets

(56) References Cited

OTHER PUBLICATIONS

Ke et al., "400 Gbit/s single-carrier and 1 Tbit/s three-carrier superchannel signals using dual polarization 16-QAM with look-up table correction and optical pulse shaping", Optics Express vol. 22, No. 1, OSA, Jan. 2014 (Year: 2014).*
Zhang et al., "Linear and Nonlinear Compensation for 8-QAM SC-400G Long-Haul Transmission Systems", Journal of Lightwave Technology, vol. 36, No. 2, Jan. 2018 (Year: 2018).*
Zhang et al., "Trans-Pacific Transmission of quad-carrier 1Tb/s DP-8QAM assisted by LUT-based MAP algorithm", OFC 2015 (Year : 2015).*
Jie Zhe, Song Zhihuan and He Jiaming, "Volterra series based predistortion for broadband RF power," Journal of Systems Engineering and Electronics, 19(4), 666-671 (2008) (6 pp.).
Zhenning Tao, Tong Ye, Xiaofei Su, Yangyang Fan, Yanhui Qi, Hsiao Nakashima and Takeshi Hoshida, "Nonlinear Characteristic of Wideband Coherent Receiver and the Application of Wiener-Hammerstein Model," Asia Communications and Photonics Conference, S4B.4 (2019) (3pp.).
Jian Hong Ke, Ying Gao, and John C. Cartledge, "400 Gbit/s single-carrier and 1 Tbit/s three-carrier superchannel signals using dual polarization 16-QAM with look-up table correction and optical pulse shaping," Optics Express 22(1), 71-84 (2014) (13 pp.).

* cited by examiner

| LUT ADDRESS | $x_{i-1}$ | $x_i$ | $x_{i+1}$ | $\Delta y$ |
|---|---|---|---|---|
| 1 | Level 1 | Level 1 | Level 1 | $\Delta y\_1$ |
| 2 | Level 1 | Level 1 | Level 2 | $\Delta y\_2$ |
| 3 | Level 1 | Level 1 | Level 3 | $\Delta y\_3$ |
| 4 | Level 1 | Level 1 | Level 4 | $\Delta y\_4$ |
| ⋮ | ⋮ | ⋮ | ⋮ | ⋮ |
| 8^3 | Level 8 | Level 8 | Level 8 | $\Delta y\_8^3$ |

| DETECTION THRESHOLD | | LEVEL |
|---|---|---|
| | | Level 1 |
| Level_th1 | → | |
| | | Level 2 |
| Level_th2 | → | |
| | | Level 3 |
| Level_th3 | → | |
| | | Level 4 |
| Level_th4 | → | |
| | | Level 5 |
| Level_th5 | → | |
| | | Level 6 |
| Level_th6 | → | |
| | | Level 7 |
| Level_th7 | → | |
| | | Level 8 |

| LUT ADDRESS | $x_{i-1}$ | $x_i$ | $x_{i+1}$ | $\Delta y$ |
|---|---|---|---|---|
| 1 | Level 1 | Level 1 | Level 1 | $\Delta y\_1$ |
| 2 | Level 1 | Level 1 | Level 2 | $\Delta y\_2$ |
| 3 | Level 1 | Level 1 | Level 3 | $\Delta y\_3$ |
| 4 | Level 1 | Level 1 | Level 4 | $\Delta y\_4$ |
| ⋮ | ⋮ | ⋮ | ⋮ | ⋮ |
| 4^3 | Level 4 | Level 4 | Level 4 | $\Delta y\_4\char`\^3$ |

NONLINEARITY COMPENSATION CIRCUIT, AND OPTICAL TRANSCEIVER

CROSS-REFERENCE TO RELATED APPLICATIONS

This application is based upon and claims priority to earlier Japanese Patent Application No. 2022-056189 filed Mar. 30, 2022, which is incorporated herein by reference in its entirety.

FIELD

The present documents relate to a nonlinearity compensation circuit, and an optical transceiver.

BACKGROUND

With progress of modulation/demodulation techniques, optical data transmission using high-level modulation formats is becoming mainstream. Fiber optic data communication requires less waveform distortion and a higher signal-to-noise ratio (SNR) at both the transmitter side and the receiver side. Waveform distortion due to nonlinearity of analog devices at the transmitter side is one factor that limits the transmission performance of high-level modulation signals. As illustrated in FIG. 1, nonlinearity due to transmitter-side analog devices includes influence of electrical nonlinear distortions in a digital to analog converter (DAC) and a driver amplifier (denoted as "AMP" in the figure) connected to the output of the transmitter digital signal processor (denoted as "TxDSP" in the figure), and influence of electro-optic (EO) nonlinear characteristics of a Mach-Zehnder modulator (MZM). The MZM modulates a light beam incident from a light source, such as a tunable laser diode (TLD), with electrical signals input from the driver amplifier. Due to the nonlinearity described above, the waveform of the modulated optical signal is distorted and the SNR is degraded.

In addition, the peak-to-average power ratio (PAPR) increases as the degree of multilevel modulation format increases. If the power level of such a high-PAPR multilevel modulation signal is raised, the SNR is further degraded due to the nonlinearity of the transmitter-side analogue devices. Therefore, increasing the power of the output light is restricted. Several algorithms for compensating for nonlinear distortion have been proposed, including a Volterra filter (see, for example, Non-Patent Document 1 presented below), a polynomial approximation method (see, for example, Non-Patent Document 2 presented below), and lookup table (LUT) correction (for example, Non-Patent Document 3 presented below).

Algorithms of compensating for nonlinear distortion are computationally intensive. It is desired to provide a circuit design and an implementation technique that can efficiently compensate for nonlinear distortion with less amount of computation. A LUT-based compensation, which can be implemented with a relatively small amount of calculation, is promising. However, the LUT-based compensation has a problem that the circuit size increases as the number of levels (or the degree of multilevel modulation format) of the input signal increases. An embodiment presented below provides a nonlinearity compensation circuit which can suppress the amount of computation regardless of the degree of multilevel modulation format, and an optical transceiver using such a nonlinearity compensation circuit.

Related art documents known to the inventors are

Non-Patent Doc. 1: Jin Zhe, Song Zhihuan and He Jiaming, "Volterra series based predistortion for broadband RF power," Journal of Systems Engineering and Electronics, 19(4), 666-671 (2008)

Non-Patent Doc. 2: Zhenning Tao, Tong Ye, Xiaofei Su, Yangyang Fan, Yanhui Qi, Hisao Nakashima and Takeshi Hoshida, "Nonlinear Characteristic of Wideband Coherent Receiver and the Application of Wiener-Hammerstein Model," Asia Communications and Photonics Conference, S4B.4 (2019); and Non-Patent Doc. 3: Jian Hong Ke, Ying Gao, and John C. Cartledge, "400 Gbit/s single-carrier and 1 Tbit/s three-carrier superchannel signals using dual polarization 16-QAM with look-up table correction and optical pulse shaping," Optics Express 22(1), 71-84 (2014).

SUMMARY

In an embodiment, a nonlinearity compensation circuit includes a detector that detects a combination of input levels of a plurality of input signals, a memory that saves a correction value information item to compensate for nonlinear distortion, the correction value information item being saved corresponding to the combination of the input levels, and a compensator that corrects a target signal among said plurality of input; signals using the correction value information item acquired from the memory based on the combination of the input levels detected by the detector.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 6 illustrates a configuration example of an LUT;

EMBODIMENTS

Figure 1:
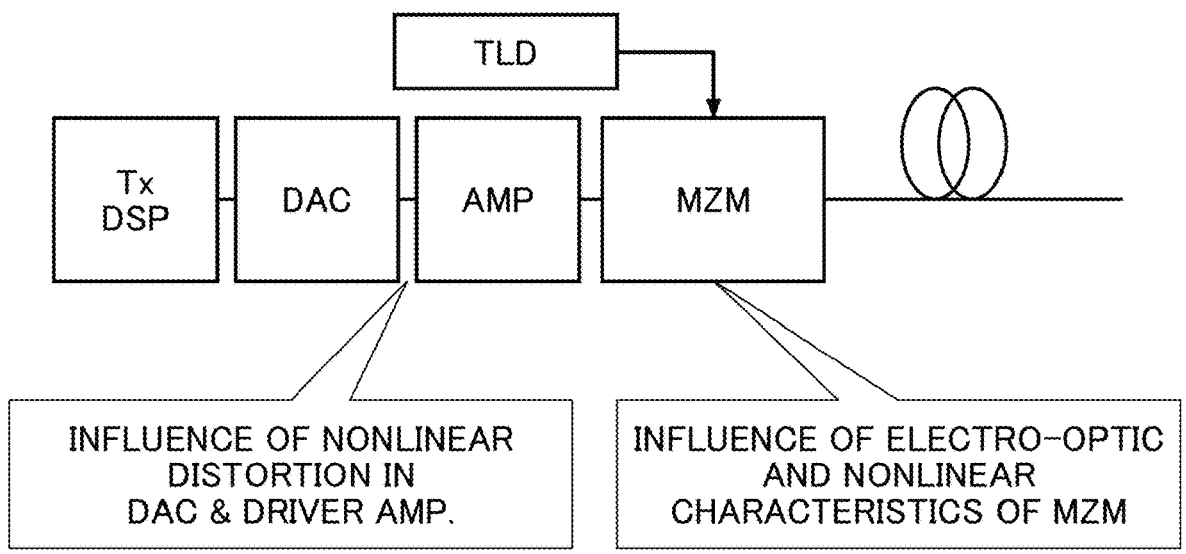
FIG. 1 illustrates occurrence of nonlinear distortion at a transmitter side.
Figure 2:
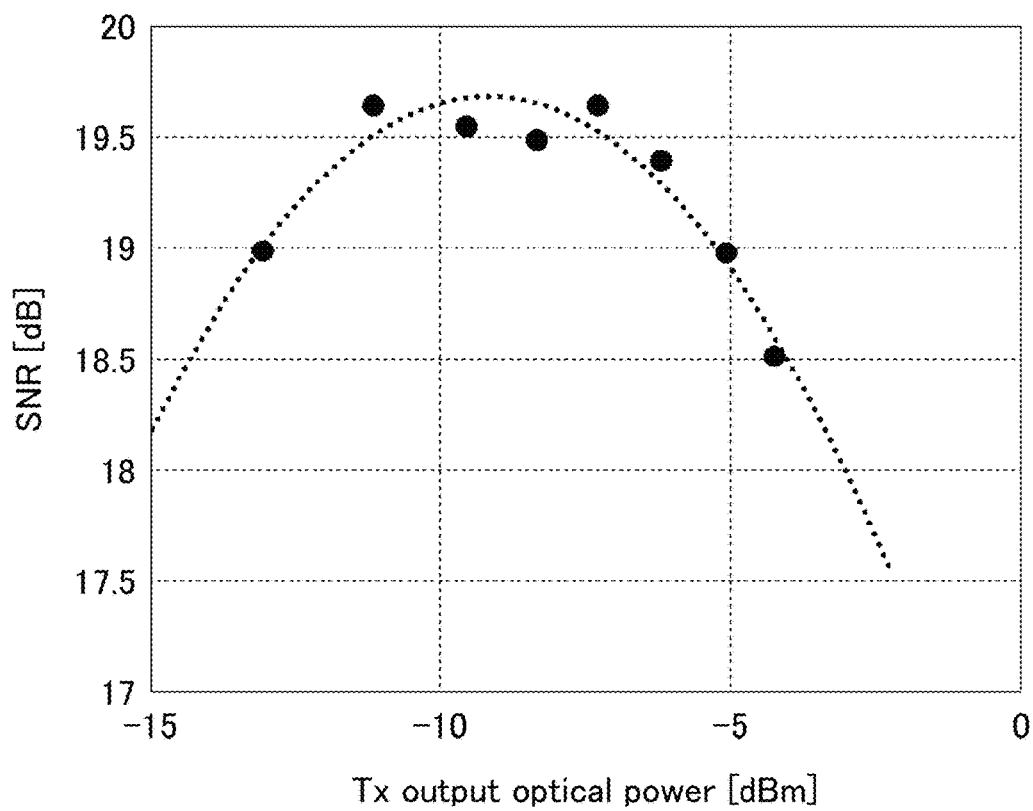
FIG. 2 illustrates a relationship between output power and SNR of an optical signal.

Nonlinearity compensation techniques of the embodiments are described below with reference to the drawings. Based to the inventors' study, with a large-amplitude signal input to an analog device such as a DAC or a driver amplifier in an optical transmitter front-end circuit (or an electrical to optical converting circuit), the SNR deteriorates due to the nonlinearity of the analog device. Specifically, the SNR lowers due to the influence of nonlinearity when the optical power exceeds a certain level, as illustrated in FIG. 2. The transmission quality will be degraded under the circumstance where the output power of the optical transmitter is raised by increasing the amplitude of the electrical signal output from the DAC or the driver amplifier to generate a large-amplitude drive signal for driving the modulator.

If a complicated algorithm is implemented in order to compensate for the waveform distortion induced by the nonlinearity, the amount of calculation increases, which makes it difficult to achieve efficient compensation for nonlinear distortion. The embodiments will provide a configuration and a scheme that can compensate for nonlinear distortion without requiring a complicated algorithm or intensive computation. The nonlinearity compensation technique according to the embodiments is applicable in general to digital coherent optical transmission, digital signal processing, and equalization in fiber optic communications. In the following description, the same components are denoted by the same reference numerals, and redundant description is avoided.

Figure 3:
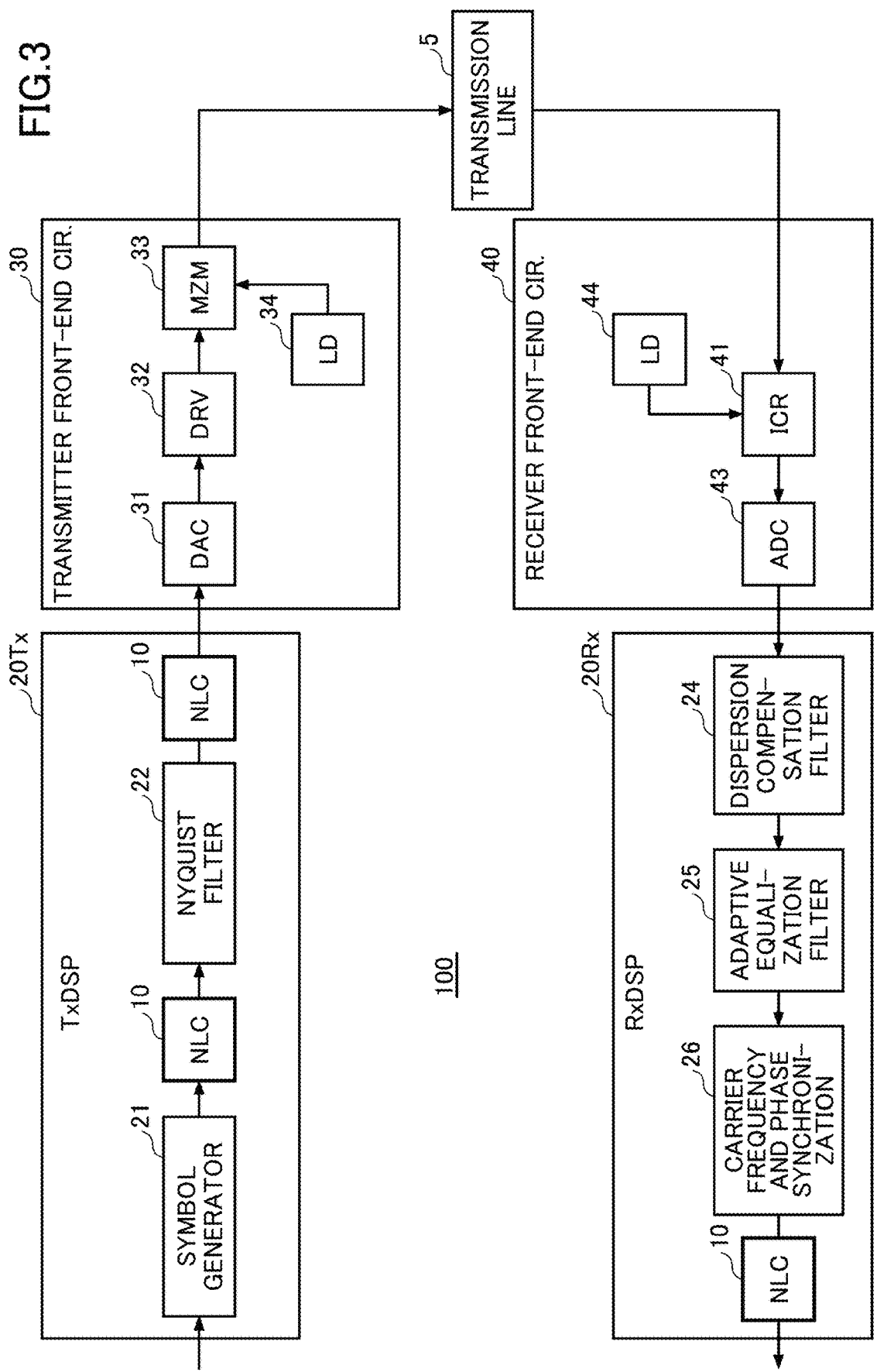
FIG. 3 is a schematic diagram of an optical transceiver to which a nonlinearity compensation circuit is applied according to an embodiment.

FIG. 3 is a schematic diagram of an optical transceiver 100, to which a nonlinearity compensation circuit (denoted as "NLC" in the figure) 10 of an embodiment is applied. The optical transceiver 100 has a transmitter DSP 20Tx, a receiver DSP (denoted as RxDSP" in the figure) 20Rx, a transmitter front-end circuit 30, and a receiver front-end circuit 40. The transmitter front-end circuit 30 and the receiver front-end circuit 40 are connected to the transmission line 5, and transmits and receives optical signals to and from the transmission line 5.

The transmitter front-end circuit 30 has a DAC 31, a driver 32, an optical modulator (denoted as "MZM") 33, and a light source (denoted as "LD") 34. Analog devices such as the DAC 31 or the driver 32, and the optical modulator 33 tend to induce nonlinear distortion. Such nonlinear distortion can be compensated for in advance by the nonlinearity compensation circuit 10 in a manner described below.

The transmitter DSP 20Tx has a symbol generator 21 that generates data symbols according to the modulation/demodulation scheme being employed, and a Nyquist filter 22 that shapes the waveform of the generated data symbols. The nonlinearity compensation circuit 10 may be provided between the symbol generator 21 and the Nyquist filter 22, or at the output side of the Nyquist filter 22.

With the nonlinearity compensation circuit 10 connected to the output of the symbol generator 21, the waveform of the signal input to the nonlinearity compensation circuit 10 represents symbol information. In this case, possible amplitude levels are limited, and nonlinearity compensation operation can be performed at 1 sample per symbol (sps). This configuration allows a small circuit scale. With the nonlinearity compensation circuit 10 provided after the Nyquist filter 22, nonlinearity compensation is performed using a waveform close to one that is input to the analog device inducing nonlinear distortion, such as the DAC 31 of the transmitter front-end circuit 30. Therefore, nonlinearity compensation can be performed more accurately, and the optical transmission performance is expected to be improved. By performing nonlinearity compensation before the data signal is supplied to the transmitter front-end circuit 30, nonlinear distortion which may occur in the analog devices or the optical modulator 33 of the transmitter front-end circuit 30 can be pre-equalized.

The receiver front-end circuit 40 has an integrated coherent receiver (ICR) 41, an analog-to-digital converter (ADC) 43, and a light source (LD) 44. These components included in the receiver front-end circuit 40 are analog devices that process analog signals. The optical signal received from the transmission line 5 may still contain nonlinearity due to insufficient pre-equalization at the transmitter side. The received signal, which has been converted into an electric signal and digitalized by the receiver front-end circuit 40, is input to the receiver DSP 20Rx. A dispersion compensation filter 24 compensates for dispersion having occurred on the transmission path 5. An adaptive equalization filter 25 shapes the waveform by adaptive equalization. A carrier frequency and phase synchronization circuit 26 recovers the originally transmitted signal.

A nonlinearity compensation circuit 10 may be connected to the output of the carrier frequency and phase synchronization circuit 26. With this configuration, the nonlinearity compensation circuit 10 compensates for nonlinear distortion remaining in the received signal containing a random noise generated in the transmission line 5. The nonlinearity compensation circuit 10 arranged in the receiver can successively update the correction value for nonlinearity compensation based on the received waveform, so it is resistant to fluctuations.

Although, in FIG. 3, the nonlinearity compensation circuit 10 is provided in the transmitter DSP 20Tx or the receiver DSP 20Rx, the nonlinearity compensation circuit 10 may be provided as an external arithmetic unit or logic device outside the DSP. The nonlinearity compensation circuit 10 can be implemented as an arithmetic processing circuit such as an LSI circuit or a microprocessor, or a logic circuit including an application specific integrated circuit (ASIC) or a field programmable gate array (FPGA).

Figure 4:
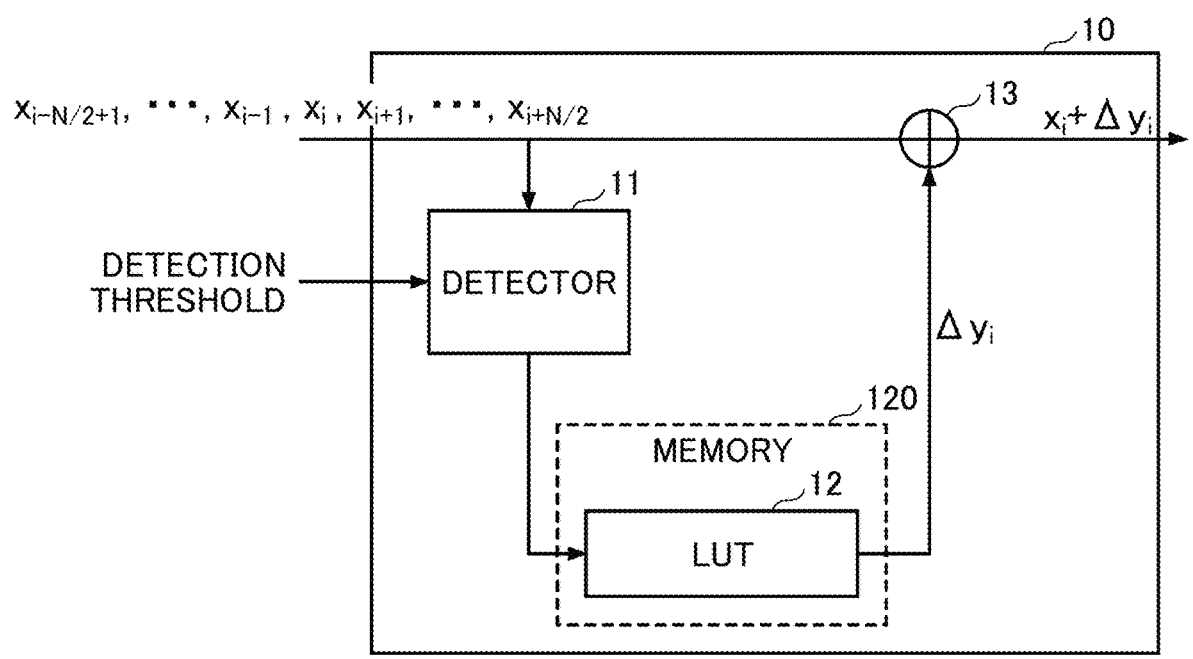
FIG. 4 is a schematic diagram of a nonlinearity compensation circuit.

FIG. 4 is a schematic diagram of the nonlinearity compensation circuit 10 according to an embodiment. The nonlinearity compensation circuit 10 performs LUT-based nonlinearity compensation in the embodiment, but it is unnecessary to always have an LUT. The nonlinearity compensation circuit 10 may employ any suitable configuration as long as an appropriate correction value can be determined using a memory function and an arithmetic function. The nonlinearity compensation circuit 10 can be provided on either the transmitter side or the receiver side of the optical transceiver 100, as described above. The nonlinearity compensation circuit 10 has a detector 11, an LUT 12, and an adder 13. The LUT 12 is an example of correction value information stored in a memory 120. The adder 13 is an example of a compensator that corrects an input signal using the correction value information. N signals $x_{i-N/2+1}, \ldots, x_i, \ldots, x_{i+N/2}$ are sequentially input to the nonlinearity compensation circuit 10. The N signals may be data symbols generated according to the modulation scheme, or digital data having been subjected to Nyquist waveform shaping. Alternatively, the N signals may be sampled signals obtained by sampling the restored waveform of the received signal. In FIG. 4, each of the signals input to the nonlinearity compensation circuit 10 is called a "symbol" on the premise of 1 sample per symbol (sps).

Upon input of signals to the nonlinearity compensation circuit 10, the detector 11 determines the input level of each of a plurality of consecutive symbols (for example, three consecutive symbols), referring to detection threshold information, and detects a combination of input levels. How the input levels are determined will be described later. A combination of the input levels of the consecutive symbols is called an "address" for convenience. The detection threshold may be saved in the memory 120 which is incorporated in a microprocessor or FPGA for implementing the nonlinearity compensation circuit 10. Alternatively, the detection threshold may be written in the detector 11.

When one address is generated from, for example, three consecutive symbols, the input level of the i-th symbol $x_i$, and the input levels of the adjacent symbols $x_{i-1}$ and $x_{i+1}$ before and after $x_i$ are determined. The reason why the input levels of the preceding and subsequent symbols are determined is that there is a high probability that the input level of the target symbol is affected by the adjacent data items. A set of input levels of consecutive symbols represents the change in amplitude of the input symbols. The number of symbols that configures one address is not limited to three, and input levels of five or more consecutive symbols may be used.

The LUT 12 is searched for an address corresponding to the combination of input levels detected by the detector 11, and the correction value $\Delta y_i$ associated with the retrieved address is acquired from the LUT 12. The correction value $\Delta y_i$ is used for nonlinearity compensation for the i-th symbol $x_i$. The adder 13 adds the correction value $\Delta y_i$ to the i-th symbol $x_i$ to compensate for the nonlinearity, and outputs the correction result.

<Detection Threshold for Nonlinearity Compensation>

Figure 5:
FIG. 5 illustrates a first example of threshold configuration for determining an input signal level.

FIG. 5 illustrates the first example showing how the threshold of determining the input signal level is set, together with a data signal input to the nonlinearity compensation circuit 10. In this example, the input level of symbol data of 64-quadrature amplitude modulation (64-QAM) generated by the symbol generator 21 is determined. With 64QAM, there are 8 amplitude levels in the I-axis direction and 8 amplitude levels in the Q-axis direction on the constellation (IQ complex plane). Focusing on the Q-axis, seven detection thresholds may be set between adjacent symbols along the Q axis to identify all the eight amplitude levels, as illustrated in diagram (c) of FIG. 5. The input signal level can be precisely determined by providing a detection threshold between every adjacent amplitude level. However, as the degree of multilevel modulation format increases to 128-QAM or 256-QAM, the size of the LUT 12 increases, and it may be difficult to restrict the amount of calculation.

To avoid the increase of the LUT size, the number of detection thresholds is decreased by grouping several amplitude levels in the same level for the purpose of determining the input signal level when a high-level modulation format is used, as illustrated in diagrams (a) and (b) of FIG. 5. This makes it possible to determine the input signal level using fewer detection thresholds than the number of amplitudes levels determined by the currently employed modulation/demodulation scheme. In diagram (a) of FIG. 5, eight amplitude levels on the Q axis are evenly split into groups of two, and three detection thresholds are set. The level of the input signal is determined to be one of the four amplitude levels. The detection unit 11 determines the input level as level 1 if the amplitude of the input symbol exceeds the detection threshold 1, and determines the input level as level 2 if it exceeds the detection threshold 2 and at or below the detection threshold 1. Likewise, if the amplitude of the input symbol exceeds the detection threshold 3 and at or below the detection threshold 2, the input symbol level is determined as level 3. If the amplitude of the input symbol is at or below the detection threshold 3, the input symbol level is determined as level 4.

With this detection scheme, the number of combinations of input levels of consecutive symbols is reduced, and the size of the LUT 12 is kept compact. The threshold-based determination of the input signal level performed by the nonlinearity compensation circuit 10 is not necessarily strict determination, unlike the symbol detection for demodulating the received signal, but is level identification for selecting an appropriate correction value for nonlinearity compensation. The nonlinearity compensation process is not impeded even without precise level detection criteria as illustrated in diagram (c) of FIG. 5.

In diagram (b) of FIG. 5, among the eight amplitude levels along the Q-axis, the input symbol level is accurately determined at or near the peak and valley, where the signal tends to be affected by nonlinear distortion, while the middle region has relatively high linearity in which several amplitude levels can be collectively determined. Five detection thresholds are provided to determine one of the six amplitude levels to which the input signal level belongs, where the signal level is determined precisely in the end portions of the Q axis, while allowing rough determination in the middle region.

The circuit scale of the LUT 12 is kept small by reducing the number of thresholds or the number of levels used for determination of the input signal level, and reducing the number of addresses, namely the number of combinations of input levels. Although FIG. 5 focuses on the Q-axis, the same configuration is applied to determination of the input signal level in the I-axis direction.

FIG. 6 illustrates a configuration example of the LUT 12. This LUT 12 is based on the threshold configuration (c) of in FIG. 5. With 64QAM modulation having eight amplitude levels from level 1 to level 8 along each of the I-axis and the Q-axis, seven detection thresholds from threshold Level_th1 to Level_th7 are provided to separate all the amplitude levels.

It is assumed that the input levels of three consecutive symbols (or samples) of the signal input to the nonlinearity compensation circuit 10 are determined to specify an address representing the combination of the input levels of the three symbols. The LUT 12 describes all possible combinations or addresses of the input levels that three consecutive symbols $x_{i-1}$, $x_i$, and $x_i+_1$ can take, and correction values $\Delta y$ provided to the input symbols $x_i$ of the respective addresses.

At address 1, all three symbols have amplitude level 1, and correction value $\Delta y\_1$ for nonlinearity compensation is given to this combination of address 1. At address 2, the input levels of three consecutive symbols are level 1, level 1, and level 2. A correction value $\Delta y\_2$ for nonlinearity compensation is given to this combination of address 2. At address 3, the input levels of three consecutive symbols are level 1, level 1, and level 3. A correction value $\Delta y\_3$ for nonlinearity compensation is given to this combination of address 3. Since eight amplitude levels and three consecutive input symbols are used, the LUT 12 describes a total of 512 (which equals to 8^3) addresses, and the same number of correction values $\Delta y$ are provided for the respective addresses. Assuming that m is the number of consecutive symbols whose amplitude levels are to be determined, and that L is the number of amplitude levels used, then the LUT 12 describes L^m addresses and L° m correction values Δy corresponding to the respective addresses.

Every time the detection unit 11 detects a combination of input levels for a plurality of consecutive symbols to specify an address representing the combination, the LUT 12 selects a correction value Δy from the corresponding address. Using the selected correction value Δy, the target symbol xi is corrected. This correction compensates in advance for nonlinear distortion that may occur in the transmitter front-end circuit 30.

In the case of 64QAM, the size of the LUT 12 is still small even if all the eight amplitude levels are determined along the Q-axis and/or the I-axis, with less amount of calculation compared to known LUT-based nonlinearity compensation algorithms. As the number of levels of the modulation format increases to, for example, 128QAM or 256QAM, the size of the LUT 12 may increase. In that case, the threshold configuration (a) or (b) in FIG. 5 can be adopted.

Figure 7:
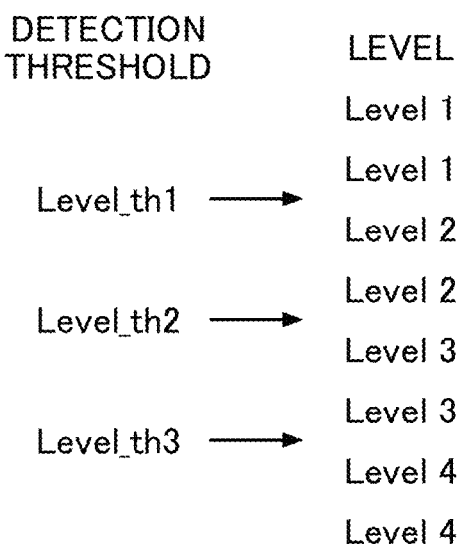
FIG. 7 illustrates another configuration example of the LUT.

FIG. 7 illustrates another configuration example of the LUT 12. The LUT 12 of FIG. 7 is based on the threshold configuration (a) of FIG. 5, in which the amplitude levels are evenly split into several groups. Of the eight amplitudes along the Q-axis (or I-axis) of 64QAM, the top two input levels exceeding the threshold Level_th1 are determined to be level 1. With the input level exceeding the threshold Level_th2 and at or below the threshold Level_th1, level 2 is detected. With the input level exceeding the threshold Level_th3 and at or below the threshold Level_th2, level 3 is detected. With the input level at or below the threshold Level_th3, level 4 is detected.

With this configuration, there are four amplitude levels, and the number of addresses in the LUT 12 describing the combinations of input levels of three consecutive symbols (or samples) is 4^3, which equals to 64. The size and the amount of calculation of the LUT 12 is further reduced. Five consecutive symbols may be used for the input level determination because the number of amplitude levels to be determined is small. The total number of addresses is 4^5 or 256 even if the input levels of five consecutive symbols are determined. When the configuration (b) of FIG. 5 with uneven grouping is adopted, six amplitude levels are used, and the LUT 12 has 216 or 6^3 addresses and the same number of correction values Δy corresponding to the addresses.

By appropriately setting the detection thresholds or the amplitude levels to be determined, the size of the LUT 12 and the amount of calculation can be reduced. Nonlinear distortion can be efficiently compensated for, regardless of the degree of multilevel modulation. The similar effect can be achieved when the nonlinearity compensation circuit 10 is connected to the output of the Nyquist filter 22 or the sampling result of the electrical signal waveform restored by the receiver DSP.

Figure 8:
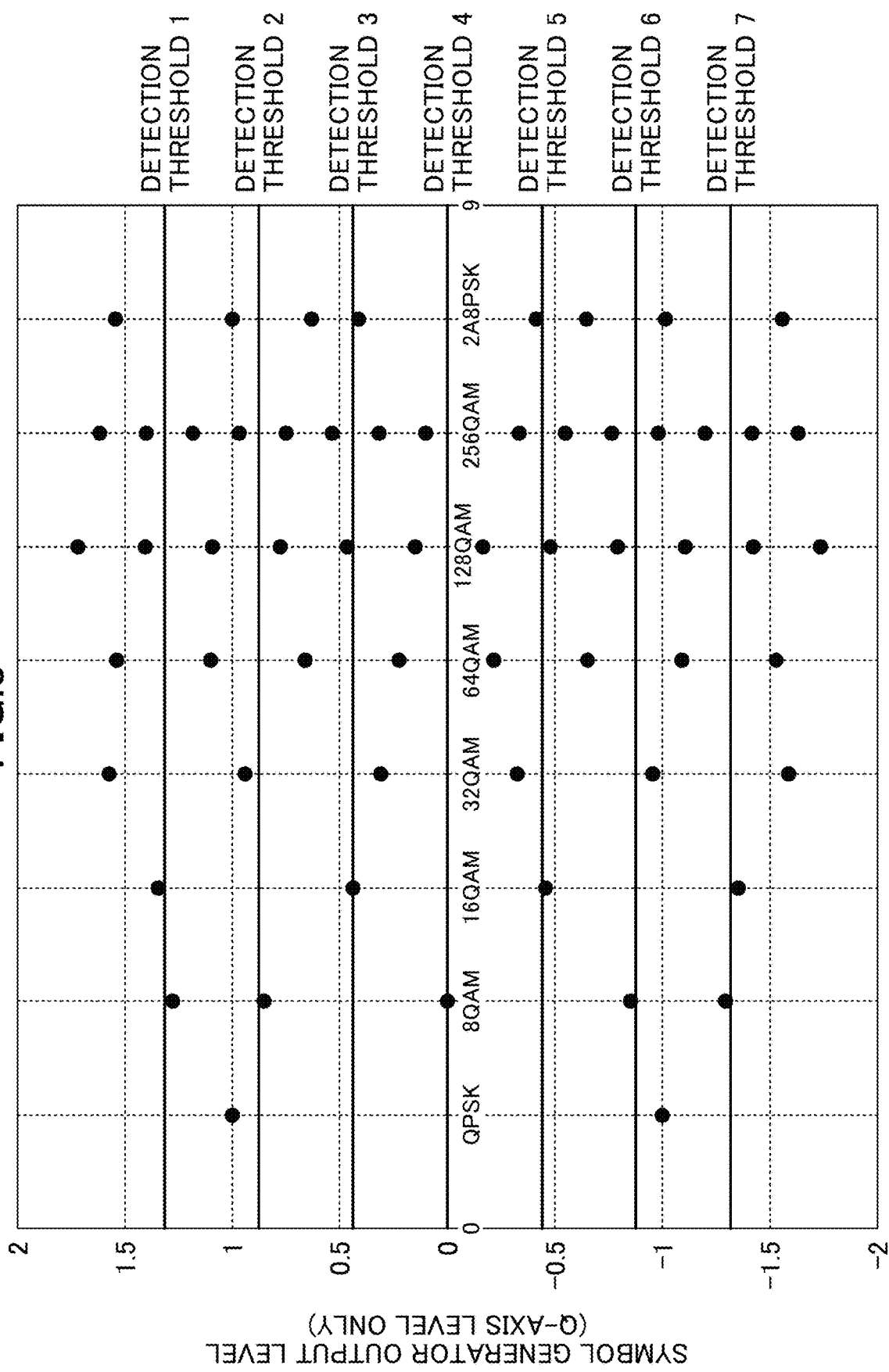
FIG. 8 illustrates a second example of threshold configuration for determining an input signal level.

FIG. 8 illustrates the second example of threshold configuration for determining the input signal level. In the first example of FIG. 5, the input level is determined by setting appropriate detection threshold in accordance with the modulation scheme being used. For example, 8 amplitude levels are set for 64QAM, and 6 uneven amplitude levels are set for 128QAM with the threshold configuration (b) of FIG. 5. In FIG. 8, a common detection threshold is used among different modulation/demodulation schemes.

The horizontal axis of FIG. 8 represents modulation scheme, and the vertical axis represents output level of the symbol generator 21, which is the input level to the nonlinearity compensation circuit 10. Seven thresholds from threshold 1 to threshold 7 are set to determine eight amplitude levels common to different modulation schemes such as QPSK, 8QAM, 16QAM, 32QAM, 64QAM, 128QAM, 256QAM, and 2A8PSK. In this example, the center amplitudes between adjacent amplitude levels of 64QAM symbol output are used as the default thresholds. Regardless of which modulation/demodulation scheme is used, every one of the generated symbols belongs to any one of the amplitude levels. Except for 128QAM and 256QAM, all symbol levels can be identified separately using the default thresholds. For 128QAM and 256QAM, some symbol levels are grouped in the same amplitude group to identify the input level.

By setting the commonly used detection thresholds, the same effect as that of reducing the number of threshold levels is achieved for high degree multilevel modulation/demodulation, and the size of the LUT 12 can be kept small.

Figure 9:
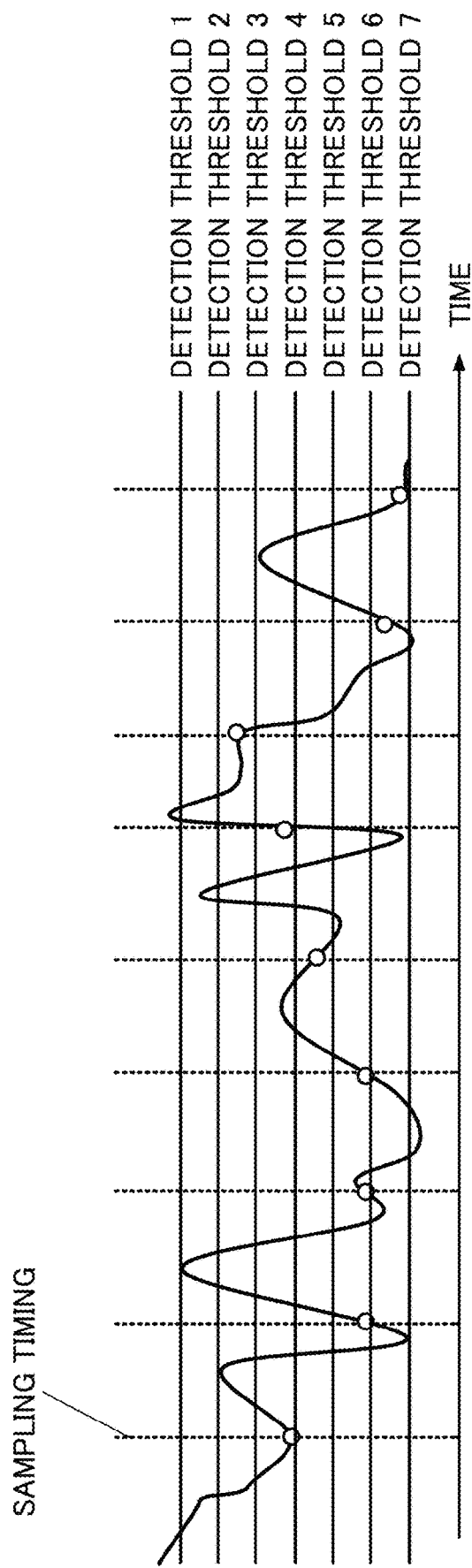
FIG. 9 illustrates a third example of threshold configuration for determining an input signal level.

FIG. 9 illustrates the third example of threshold configuration for determining the input signal level. This threshold configuration can be used to perform nonlinearity compensation on the restored random input signal at the receiver side. Seven detection thresholds 1 to 7 are set for the input waveform. The restored electrical waveform is sampled at predetermined timings. A sampled signal always belongs to any one of the amplitude levels. An address representing a combination of amplitude levels of consecutive samples is detected, and a correction value Δy is obtained from the address described in the LUT 12. The correction value Δy can be used to compensate for nonlinear distortion remaining in the signal having travelled through the transmission line, on the receiver side.

<Calculation of Correction Value Δy>

Figure 10:
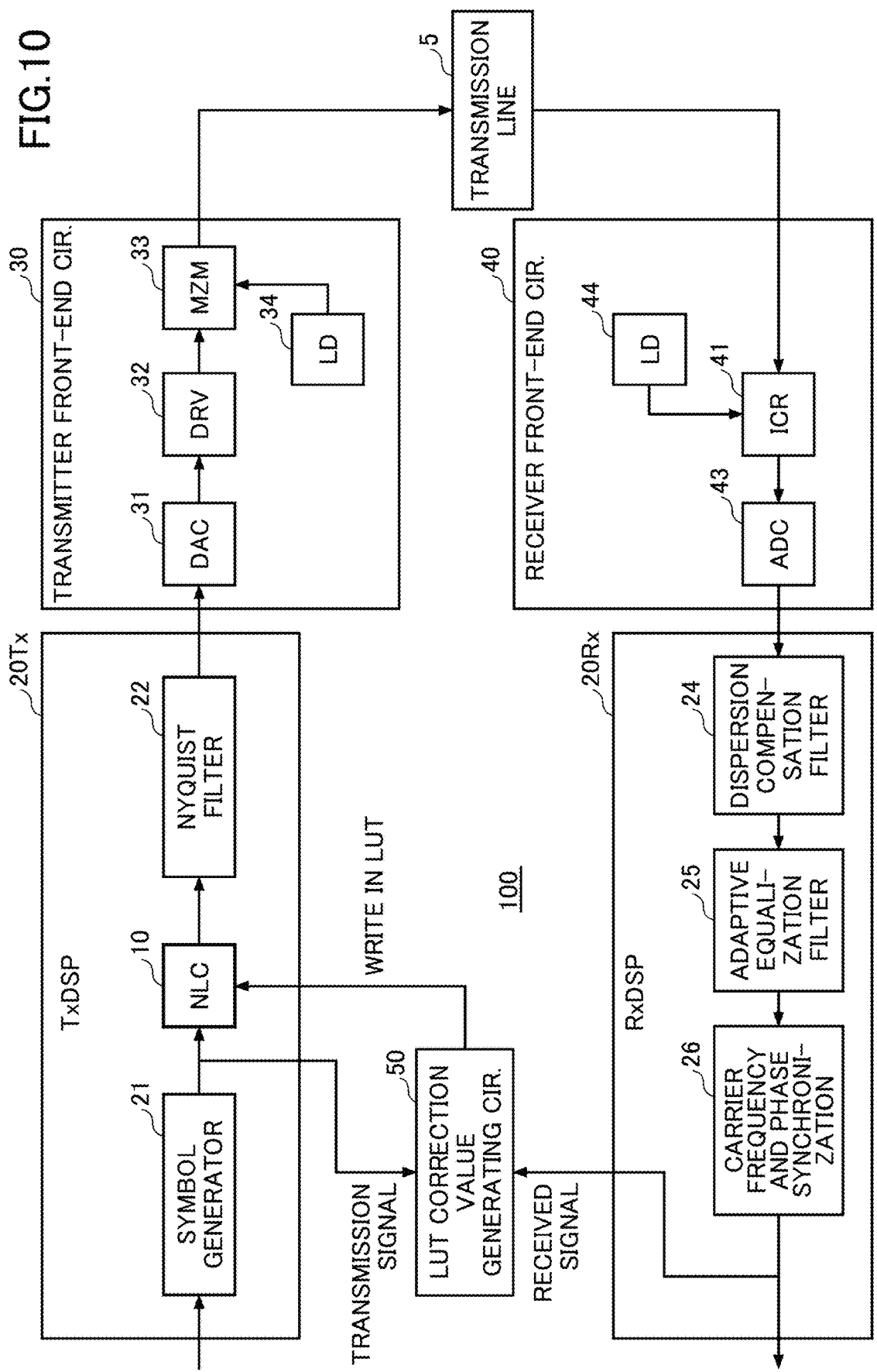
FIG. 10 illustrates generation of correction values used in the LUT.

FIG. 10 illustrates generation of correction values described in the LUT12. The correction values Δy written in the LUT 12 are calculated based on the transmission signals and the received signals. In this example, the nonlinearity compensation circuit 10 is connected to the output of the symbol generator 21. Except for the LUT correction value generating circuit 50, the basic configuration of the optical transceiver 100 is the same as the configuration illustrated in FIG. 3, and redundant description will be avoided.

First, a process for creating the LUT 12 will be explained. The symbol generator 21 of the transmitter DSP 20Tx generates a transmission signal using a known signal, and supplies the generated transmission signal to the LUT correction value generating circuit 50. On the other hand, a known signal is received from the transmission line 5, and restored by the carrier frequency and phase synchronization circuit 26 of the receiver DSP 20Rx. The restored signal is supplied to the LUT correction value generating circuit 50. The LUT correction value generating circuit 50 calculates a correction value, which is to be set in the LUT 12, based on the difference between the transmission signal and the received signal. The calculated correction value Δy may be written as the initial value of the correction term in the LUT 12.

During actual service, the correction values of the LUT 12 can be updated in real time by periodically inserting the known signal into the transmission data generated by the symbol generator 21 to calculate the correction values at the LUT correction value generating circuit 50. The known signal may be a known training sequence.

With the configuration in which the nonlinearity compensation circuit 10 is connected to the output of the Nyquist filter 22, the waveform having undergone Nyquist filtering is used as the expected value of the transmission signal. In this case, the LUT correction value generating circuit 50 compares the transmission signal having been subjected to the Nyquist filtering with the received signal to generate a correction value. The LUT correction value generating circuit 50 may be implemented by a microprocessor for transmission/receiving control, an FPGA, or other logic devices provided independently from the DSP. Alternatively, the LUT correction value generating circuit 50 may be provided inside the receiver DSP 20Rx or the transmitter DSP 20Tx. Information required for generating correction values for the LUT 12 (e.g., known signal insertion timing needed at the receiver side) may be acquired via the system or a communication channel for transmission/receiving control.

Figure 11:
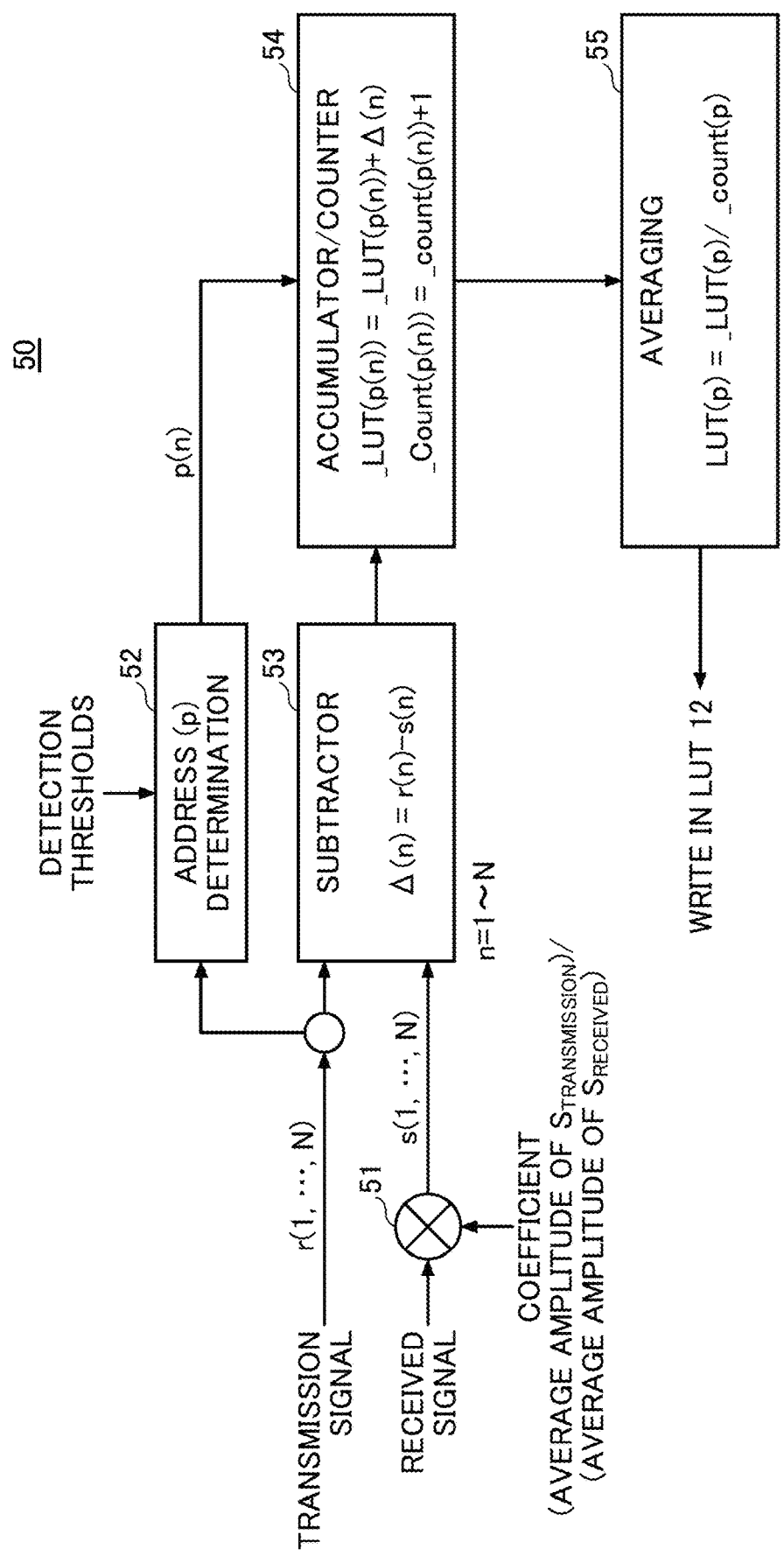
FIG. 11 is a schematic diagram of an LUT correction value generating circuit.

FIG. 11 is a schematic diagram of the LUT correction value generating circuit 50. The LUT correction value generating circuit 50 has a multiplier 51, an address determination circuit 52, a subtractor 53, an accumulator/counter 54 and an averaging section 55. As has been described above, the nonlinearity compensation correction value of the LUT 12 is generated using an expected value of the transmission signal (r) and a received signal (s).

The transmission signal r (1, ..., N) and a signal received from the transmission line are input to the LUT correction value generating circuit 50. There is a certain difference in the input level between the amplitudes of the transmission signal and the received signal due to attenuation on the transmission line 5, and therefore, the received signal is multiplied by a coefficient at the multiplier 51 to produce a received signal r (1, ..., N) used for comparison. The coefficient as the multiplication factor may be calculated by dividing the average amplitude of the transmission signal by the average amplitude of the received signal. The transmission signal r(1, ..., N) and the coefficient-multiplied received signal s(1, ..., N) are input to the subtractor 53, and a difference $\Delta(n)$ between the transmission signal r(n) and the level-adjusted received signal s(n) is calculated.

The transmission signal r(1, ..., N) is also input to the address determination circuit 52, in parallel with the input to the subtractor 53, to acquire an address (p) which is to be described in the LUT 12. If one address is composed of a set of input levels of three consecutive symbols, the address determination circuit 52 refers to the detection thresholds to determine the input levels of three consecutive transmission signals r(n−1), r(n), and r(n+1) to determine the address p(n) indicating the combination of the three input levels.

The difference $\Delta(n)$ acquired at the subtractor 53 and the address p(n) currently determined by the address determination circuit 52 are input to the accumulator/counter 54. The difference $\Delta(n)$ is added to and accumulated in the accumulation field corresponding to the address p(n), and the counter for address p(n) is incremented. The reason for accumulating the differences $\Delta(n)$ for the same address p(n) is that averaging a plurality of differences enables more objective determination of a correction value $\Delta y$ for a certain address p(n) used for linearity compensation.

The "_LUT(p(n))" in accumulator/counter 54 denotes the accumulated difference value for address p(n) of the LUT 12, which is obtained by adding $\Delta(n)$ to the previous accumulated value. The "_Count(p(n))" denotes a counter value for address p(n), and the counter value is incremented by 1 every time the combination of input levels defined by the address p(n) appears.

When the counter value reaches the end value, the averaging section 55 calculates the average of the differences for the address p(n). The averaging section 55 divides the cumulative value _LUT(p) of the differences $\Delta$ by the end value _count(p) of the counter to determine the average of the differences $\Delta$. The average of the differences is written in the LUT 12 of the nonlinearity compensation circuit 10 as the correction value for the address p(n).

By accumulating and averaging the differences between the transmission signal and the received signal for each address, namely each combination of input levels, a correction value for compensating for nonlinearity can be appropriately determined. The calculation of the correction value can be performed not only for creating the LUT 12, but also for updating the correction value $\Delta y$ in real time periodically or as needed during actual service.

Figure 12:
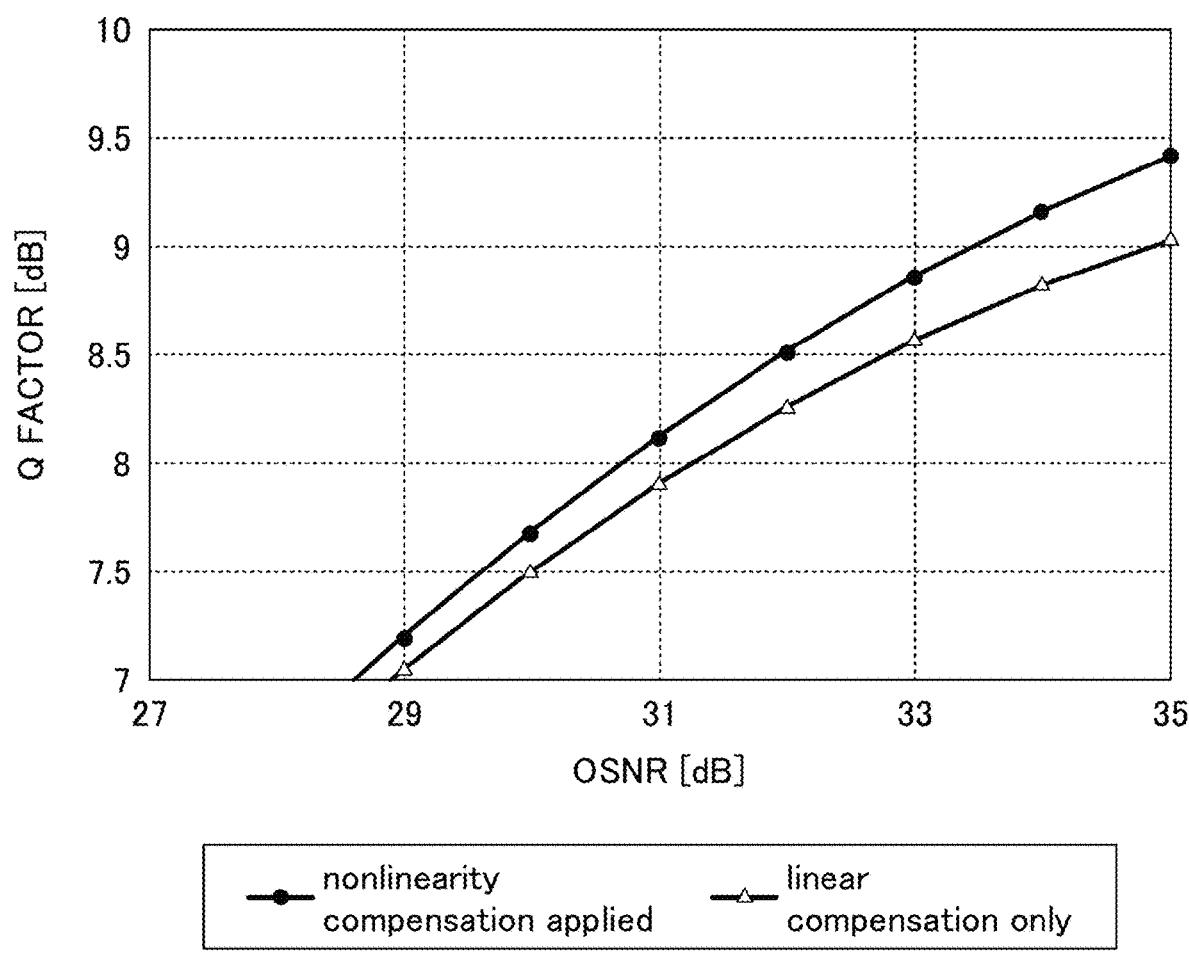
FIG. 12 illustrates an advantageous effect of nonlinearity compensation according to the embodiment.

FIG. 12 illustrates an advantageous effect of nonlinearity compensation according to the embodiment. The horizontal axis represents OSNR (dB), and the vertical axis represents Q factor (dB). The line fitted to the circled data points indicates the transmission quality when nonlinearity compensation of the embodiment is applied. The line fitted to triangular data points indicates the transmission quality when only linear compensation is performed. Both indicate the transmission quality using 64QAM modulation. Nonlinearity compensation is performed immediately after the symbol generator 21. It can be understood from FIG. 12 that the transmission quality is improved by applying nonlinearity compensation.

Figure 13:
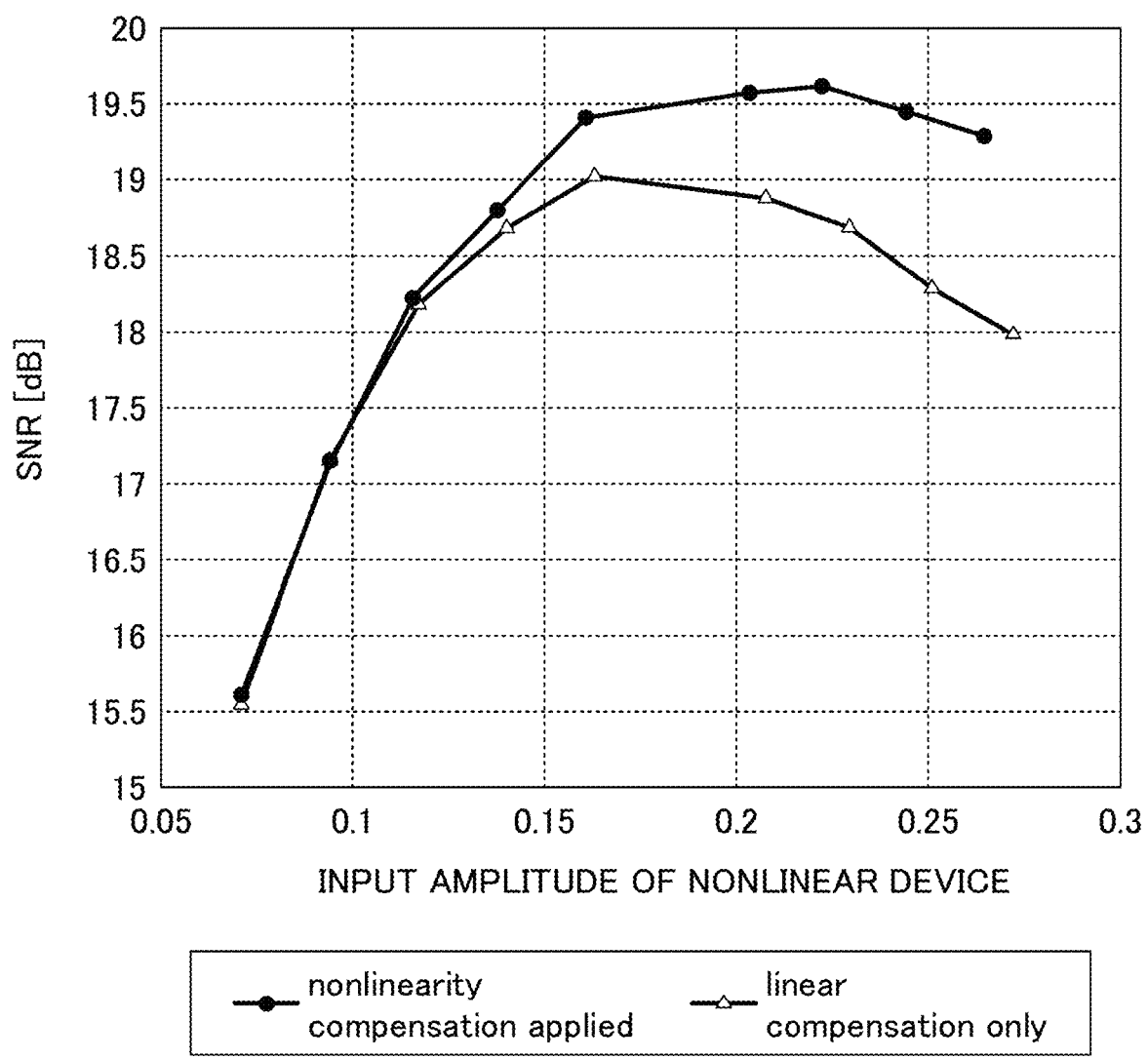
FIG. 13 illustrates an advantageous effect of nonlinearity compensation according to the embodiment.

FIG. 13 also illustrates an advantageous effect of nonlinearity compensation according to the embodiment. The horizontal axis represents input amplitude of nonlinear device, and the vertical axis represents SNR (dB). The nonlinear device is a driver amplifier of the transmitter front-end circuit 30. The line fitted to the circled data points indicates the SNR when applying nonlinearity compensation of the embodiment. The line fitted to the triangular data points indicates the SNR when applying only linear compensation, without nonlinearity compensation.

Without nonlinearity compensation of the embodiment, deterioration of SNR becomes significant as the amplitude of the input signal to a nonlinear device such as a driver amplifier increases. This phenomenon is consistent with that described with reference to FIG. 2. By performing nonlinearity compensation of the embodiment, deterioration of SNR due to the input amplitude of a nonlinear device such as a driver amplifier can be suppressed. This means that the amplitude of the input signal to the analog device of the transmitter front-end circuit can be increased because of less SNR deterioration, and the optical output power can be increased.

Although the nonlinearity compensation technique according to the embodiment has been described based on the specific examples, the invention is not limited to the above-described examples. For instance, detection thresholds, coefficients, parameters, or other information items used for nonlinearity compensation may be configured in firmware or control software outside the DSP of the optical transceiver 100, or may be installed from the outside of the optical transceiver 100. In the embodiment, the LUT 12 is used to store a correction value information item, and an "address" is used as an information item for identifying the combination of input levels. However, any suitable configuration may be adopted as long as the combination of input levels and the correction value corresponding to that combination can be specified. Although the correction value $\Delta y$ set in the LUT 12 is calculated based on the difference between the transmission signal and the level-adjusted received signal in the embodiment, a correction coefficient may be calculated based on the ratio between the transmission signal and the level-adjusted received signal so that the ratio approaches 1 (one). In this case, a divider may be used in place of the subtractor 53 of the LUT correction value generating circuit 50, and a multiplier may be used in place of the adder 13 of the nonlinearity compensation circuit 10. The adder 13 and the alternative multiplier in the nonlinearity compensation circuit 10 are examples of a compensator that compensates for nonlinear distortion.

With any alterations, nonlinear distortion occurring in fiber optic communication will be compensated using a correction value specified from the combination of the input levels of signals input to the nonlinearity compensation circuit. By grouping several amplitude levels into the same amplitude level for determining the input level, nonlinear distortion can be compensated efficiently with a small circuit scale, even if the number of multilevel modulation formats increases. By performing LUT-based nonlinearity compensation using a correction value information item, power consumption required for nonlinearity compensation can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the scope of the invention.

What is claimed is:

1. A nonlinearity compensation circuit comprising:
a detector that detects a combination of input levels of a plurality of input signals;
a memory that saves a correction value information item to compensate for nonlinear distortion, the correction value information item being saved corresponding to the combination of the input levels; and
a compensator that corrects a target signal among said plurality of input signals using the correction value information item acquired from the memory based on the combination of the input levels detected by the detector,
wherein the detector detects the combination of the input levels using a detection threshold that identifies input levels fewer than a number of amplitude levels determined by a modulation and demodulation scheme.

2. The nonlinearity compensation circuit as claimed in claim 1,
wherein the detector detects input levels of consecutive input signals including the target signal, a preceding signal, and a subsequent signal to detect the combination of the input levels.

3. The nonlinearity compensation circuit as claimed in claim 1,
wherein the detector detects the combination of the input levels using fewer detection threshold levels than the number of the amplitude levels determined by the modulation and demodulation scheme by splitting evenly or unevenly the amplitude levels determined by the modulation and demodulation scheme into groups fewer than the number of the amplitude levels.

4. The nonlinearity compensation circuit as claimed in claim 1,
wherein the detector detects the combination of the input levels using an uneven detection threshold that identifies each of the amplitude levels near a peak and a valley of the amplitude levels determined by the modulation and demodulation scheme, and that identifies two or more amplitude levels as a same amplitude level in a middle region of the amplitude levels determined by the modulation and demodulation scheme.

5. The nonlinearity compensation circuit as claimed in claim 1,
wherein the correction value information item is saved in a lookup table, and
wherein the lookup table has $L^m$ addresses where m denotes a number of said plurality of the input signals, and L denotes a number of amplitude levels to be identified.

6. A nonlinearity compensation circuit comprising:
a detector that detects a combination of input levels of a plurality of input signals;
a memory that saves a correction value information item to compensate for nonlinear distortion, the correction value information item being saved corresponding to the combination of the input levels; and
a compensator that corrects a target signal among said plurality of input signals using the correction value information item acquired from the memory based on the combination of the input levels detected by the detector,
wherein the detector detects the combination of the input levels using a common detection threshold used among two or more modulation and demodulation schemes.

7. An optical transceiver comprising:
a transmitter digital signal processor;
a transmitter front-end circuit connected to an output of the transmitter digital signal processor;
a receiver front-end circuit;
a receiver digital signal processor connected to an output of the receiver front-end circuit; and
a nonlinearity compensation circuit that compensates for nonlinear distortion of a transmission or received signal,
wherein the nonlinearity compensation circuit includes
a detector that detects a combination of input levels of a plurality of input signals,
a memory that saves a correction value information item to compensate for nonlinear distortion, corresponding to the combination of the input levels, and
a compensator that corrects a target signal among said plurality of input signals using the correction value information item acquired from the memory based on the combination of the input levels detected by the detector,
wherein the detector detects the combination of the input levels using a detection threshold that identifies input levels fewer than a number of amplitude levels determined by a modulation and demodulation scheme.

8. The optical transceiver as claimed in claim 7,
wherein the nonlinearity compensation circuit is connected to an output of a symbol generator or an output of a Nyquist filter provided in the transmitter digital signal processor, and corrects an electrical signal to be supplied to the transmitter front-end circuit.

9. The optical transceiver as claimed in claim 7,
wherein the nonlinearity compensation circuit corrects the nonlinear distortion in an electrical signal restored by the receiver digital signal processor.

10. The optical transceiver as claimed in claim 7, comprising:
a correction value generating circuit that generates the correction value information item saved in the memory,
wherein the correction value generating circuit generates the correction value information item based on a transmission signal produced by the transmitter digital signal processor and a received signal restored by the receiver digital signal processor.

11. The optical transceiver as claimed in claim 10,
wherein the correction value generating circuit detects amplitude levels of a plurality of the transmission signals to specify a combination of the amplitude levels, and calculates a correction value of a target transmission signal among said plurality of the transmission signals for the combination of the amplitude levels, based on a difference or a ratio between the transmission signal and the received signal.

\* \* \* \* \*